(12) United States Patent
Harp et al.

(10) Patent No.: US 9,415,314 B2
(45) Date of Patent: Aug. 16, 2016

(54) SYSTEM AND METHOD FOR SIMULATING GROUP PLAY WITHIN ASYNCHRONOUS VIDEOGAME CONTENT

(71) Applicant: MASLOW SIX ENTERTAINMENT, INC., San Mateo, CA (US)

(72) Inventors: Derek Harp, San Mateo, CA (US); Bengt Gregory-Brown, Springfield, OH (US); Pat N. Savelli, Dayton, OH (US); James J. Hooker, Beavercreek, OH (US)

(73) Assignee: MASLOW SIX ENTERTAINMENT, INC., San Mateo, CA (US)

( * ) Notice: Subject to any disclaimer, the term of this patent is extended or adjusted under 35 U.S.C. 154(b) by 0 days.

(21) Appl. No.: 14/612,248

(22) Filed: Feb. 2, 2015

(65) Prior Publication Data

US 2015/0148133 A1 May 28, 2015

Related U.S. Application Data

(63) Continuation of application No. 14/099,733, filed on Dec. 6, 2013, now Pat. No. 8,944,923, which is a continuation of application No. 13/075,514, filed on Mar. 30, 2011, now Pat. No. 8,608,537.

(60) Provisional application No. 61/366,078, filed on Jul. 20, 2010.

(51) Int. Cl.
  *A63F 13/00* (2014.01)
  *A63F 13/847* (2014.01)
  *A63F 13/30* (2014.01)
  *A63F 13/77* (2014.01)

(52) U.S. Cl.
  CPC .............. *A63F 13/847* (2014.09); *A63F 13/00* (2013.01); *A63F 13/12* (2013.01); *A63F 13/77* (2014.09); *A63F 2300/532* (2013.01); *A63F 2300/538* (2013.01); *A63F 2300/556* (2013.01); *A63F 2300/5553* (2013.01); *A63F 2300/5593* (2013.01); *A63F 2300/6054* (2013.01)

(58) Field of Classification Search
  CPC ....................................................... A63F 13/12
  See application file for complete search history.

(56) References Cited

U.S. PATENT DOCUMENTS

| | | | |
|---|---|---|---|
| 6,024,643 A | 2/2000 | Begis | 463/42 |
| 6,206,782 B1 | 3/2001 | Walker et al. | 463/25 |
| 8,128,498 B2 | 3/2012 | Aguilar et al. | 463/36 |
| 8,357,045 B2 | 1/2013 | Youm et al. | 463/42 |
| 8,444,490 B2 | 5/2013 | Youm | 463/42 |
| 2003/0216184 A1 | 11/2003 | Kigoshi | 463/42 |
| 2006/0121971 A1 | 6/2006 | Slomiany et al. | 463/16 |
| 2006/0154710 A1 | 7/2006 | Serafat | 463/1 |
| 2006/0205461 A1 | 9/2006 | LaRocca et al. | 463/1 |
| 2010/0030565 A1 | 2/2010 | Holt et al. | 705/7.15 |
| 2011/0092282 A1* | 4/2011 | Gary | A63F 13/12 463/31 |
| 2011/0281638 A1 | 11/2011 | Bansi et al. | 463/23 |
| 2011/0302508 A1 | 12/2011 | Harp et al. | 715/753 |
| 2012/0021825 A1 | 1/2012 | Harp et al. | 463/30 |

* cited by examiner

*Primary Examiner* — Reginald Renwick
(74) *Attorney, Agent, or Firm* — Pillsbury Winthrop Shaw Pittman LLP (57) ABSTRACT

To simulate group play, player-controlled characters may be grouped prior to entry into a set of asynchronous videogame content. Then separate instances of the set of asynchronous videogame content may be provided to players associated with individual ones of the grouped player-controlled characters. In the separate instance provided to a given player, secondary instances of the player-controlled characters other than the player-controlled character being controlled by the given player may be controlled automatically to accompany the player-controlled character being controlled by the given player.

12 Claims, 6 Drawing Sheets

SYSTEM AND METHOD FOR SIMULATING GROUP PLAY WITHIN ASYNCHRONOUS VIDEOGAME CONTENT

FIELD OF THE INVENTION

The invention relates to the simulation of synchronous group play including a plurality of players in asynchronous videogame content.

BACKGROUND OF THE INVENTION

Various types of asynchronous videogame content that can be provided to players participating in a videogame are known. Such content is typically hosted, served, or otherwise provided to users without direct in-game interactions between players that are provided in synchronous, multi-player videogames. Instead, individual players are provided with access to separate instances of the asynchronous videogame content that does not represent interactions of other players within the videogame.

Due to the asynchronous nature of known asynchronous videogame content, typically players may not able to participate with each other in group play. Instead, any cooperation, competition, or other in-game interactions between the players may be accommodated in an asynchronous manner (e.g., turn-based, leader board competition, and/or other asynchronous interactions). These types of interactions typically do not provide for the type of camaraderie, teamwork, and/or sense of community fostered by group-based synchronous play.

SUMMARY

One aspect of the invention relates to a system and method that simulate group play within asynchronous videogame content. Generally, asynchronous videogame content is less expensive to provide to players than synchronous videogame content with respect to network bandwidth, system storage, system processing, and/or other cost parameters. Simulating group play within asynchronous videogame content may provide savings with respect to these and/or other cost parameters while fostering sense of cooperation and/or community typically associated with synchronous videogame content. This may have an impact on gaining and/or retaining players of the videogame.

To simulate group play, player-controlled characters may be grouped prior to entry into a set of asynchronous videogame content. Then separate instances of the set of asynchronous videogame content may be provided to players associated with individual ones of the grouped player-controlled characters. In the separate instance provided to a given player, secondary instances of the player-controlled characters other than the player-controlled character being controlled by the given player may be controlled automatically to accompany the player-controlled character being controlled by the given player. This may provide the given player the sense of being accompanied by the other players, even though the player-controlled characters associated with the other players are not actually being controlled by the other players. Sets of asynchronous videogame content may be chained together with synchronization points at which a character group may be updated to reflect previous members that did not complete the previous set of asynchronous videogame content and/or the addition of new members for an upcoming set of asynchronous videogame content. This may mimic the attrition and/or addition of group members during group play in synchronous videogame content.

In some implementations, the system may include one or more processors executing computer program modules to provide the videogame to the users. The one or more processors may be located on one or more servers and/or one or more client computing platforms. The one or more computer program modules may include one or more of a game module, a group module, a secondary instance module, a character control module, a status module, and/or other modules.

The game module may be configured to provide the videogame to players via client computing platforms. Providing the videogame to players may include providing videogame content to the players. The videogame content may define a virtual space. The virtual space may be hosted, served, and/or otherwise provided by the game module. The players may participate in the videogame by controlling player-controlled characters in the virtual space. Control may be exercised through control inputs and/or commands input by the players through the client computing platforms.

The game module may be configured such that the videogame content provided to the players includes separate sets of asynchronous videogame content. The separate sets of asynchronous videogame content may include separate events, activities, challenges, games, puzzles, training areas, building or crafting areas, gathering or mining areas, quests, spatial locations, temporal periods (in terms of "videogame time"), interactions with non-player characters, other discrete sets of videogame content, and/or combinations of the foregoing. Progression of a player-controlled character through the videogame may require a player to control the player-controlled character through these sets of asynchronous videogame content.

Successful completion of a set of asynchronous videogame content may provide the player-controlled character with a benefit in the game. The benefits may include bonuses in character metrics such as one or more of manna, gold (or other currency), skill or ability metrics, friendship or trustworthiness metrics, and/or other character metrics. The benefits may include virtual objects provided to the player within the virtual space. The virtual objects may be wearable, bearable, storable, tradable, sellable, transferrable, destroyable, usable, inhabitable, ridable, and/or disposable. The virtual objects may include one or more of a rare object, an object with abilities, a protective object, a tool, a weapon, a pet, a vehicle, a mount, and/or other objects.

The benefits may include alliances within the videogame. The alliances may provide the players with access to areas of the virtual space, aid during battle, connections for trade, and/or other benefits. The alliances may be with non-player characters and/or player-controlled characters. The benefits may include access to and/or control over places within the virtual space.

The benefits may include new skills and/or abilities such as climbing, swimming, flight, breathing underwater, passing through tangible obstructions (e.g., objects, walls, creatures, and/or other obstructions), partial to complete camouflage and/or invisibility, stealthy activities (e.g., hiding, moving silently, moving in shadow, and/or other activities), accelerated healing, rapid recovery of strength and/or any other recoverable attribute, resistance to damage from one or more sources (e.g., when struck by iron, acid, and/or other substances or weapons), absorption of energy from one or more sources (e.g., healing when struck by wooden weapons rather than being damaged, converting the damage of a fireball into increased magical energy, and/or other absorptions of energy), increased speed, generation of one or more player or system controlled copies of the original player-controlled character, the ability to know some to all of the history of an object in the character's possession or awareness (e.g., psychometry), the ability to control objects not in the character's possession (e.g., telekinesis or force field generation), animation and/or control of normally inanimate objects, the ability to transmute objects of one material into another (e.g., metal into wood, iron into water, and/or other transmutations), the ability to generate and/or control visual/auditory/olfactory/kinetic illusions, the ability to change the size and/or shape of the character or other characters or objects, the ability to manipulate temperature of one or more objects or within one or more areas, the ability to manipulate sound (e.g., suppressing or amplifying it), the ability to control or manipulate electric, gravitic and/or magnetic energies/fields, the ability to manipulate light and/or shadow, the ability to manipulate the skills and/or abilities and/or other attributes of one or more other characters (e.g., reducing strength to cause weakness or stealing health from another character to increase one's own).

The benefits may include new perceptions and/or perceptive abilities such as sound-based vision (e.g., echolocation or sonar) and/or vision using frequencies of light beyond those initially perceptible to all characters; ultra- and/or infrasonic hearing; a 'danger' sense notifying the player of potential enemies, traps and/or pitfalls within some specified range; a 'life' sense enabling the player to monitor all characters and/or creatures within a specified range; an ability to detect material of one or more types (e.g., metal, stone, water, or more specifically, gold, iron, granite, ivory and/or others) within a specified range; a mechanic sense providing the player awareness of machines within a specified range; senses able to perceive beyond and/or through what are obstacles to other characters, such as the ability to see objects enclosed within an opaque container, or beyond normal limitations such as size, enabling microscopic and/or telescopic vision; and/or other perceptive abilities.

Other benefits are contemplated.

Some sets of asynchronous videogame content may not be available to all of the player-controlled characters. For example, some sets of asynchronous videogame content may be "locked". To unlock previously locked sets of asynchronous videogame content, a player may be required to control a corresponding player-controlled character to perform some predetermined task or set of tasks. For example, one set of asynchronous videogame content may only be accessible, or unlocked, after successful participation in another set of asynchronous videogame content. Successful participation in another set of asynchronous videogame content may include completion of the set of asynchronous videogame content, performance in excess of some performance threshold in the set of asynchronous videogame content (e.g., winning, beating a score threshold, beating a timing threshold, and/or other performance thresholds), performance of some task or activity within the set of asynchronous videogame content, and/or other standards for success in participation in the set of asynchronous videogame content.

The game module may be configured such that the sets of asynchronous videogame content may be accessible through synchronization points. One or more of the sets of asynchronous videogame content are only accessible through a corresponding synchronization point. Synchronization points may include locations within the virtual space corresponding to the videogame. The synchronization points may include synchronous locations in the virtual space in which player-controlled characters can interact with and/or observe each other in real-time or near real-time. The synchronization points may be asynchronous locations in the virtual space defined by asynchronous videogame content. The game module may be configured to enable real-time and/or near real-time communication between players present at a synchronization point. Such communication may be accomplished via text chat, instant messaging, voice chat, and/or other communication mechanisms. To access a synchronization point, a player-controlled character may be required to interact with a non-player character, perform a challenge, win a challenge, find an item, enter a code, and/or perform other activities.

The group module may be configured to form character groups of player-controlled characters so that the player-controlled characters may participate in sets asynchronous videogame content in groups. The character groups of player-controlled characters may be formed at the synchronization points in the videogame. In order to form the character groups, the group module may be configured to identify player-controlled characters present simultaneously at individual synchronization points.

The group module may be configured to form character groups automatically. The groups may be determined based on arrival time at the synchronization point (e.g., each set of four consecutive arrivals); based on races, classes, skills, abilities, and/or other features of the player-controlled characters at the synchronization point (e.g., some number of healers, some number of tanks, some number of casters, some number of damage inflicting characters, and/or other criteria); based on player-controlled character relationships (e.g., factions, guilds, friends, and/or other relationships); and/or based on other criteria. The character groups formed automatically by the group module may be imposed on the player-controlled characters at the synchronization point. The character groups formed automatically by the group module may be suggested to the players controlling the player-controlled characters.

The group module may be configured to receive group requests from players controlling player-controlled characters at the synchronization point. The group requests may be requests to include two or more player-controlled characters in the same character group. The group module may be configured to receive group requests from players via a user interface presented to players through the client computing platforms.

The group module may be configured to present group invitations to players controlling player-controlled characters that have been invited to join a character group (e.g., by virtue of a group request), and/or players controlling player-controlled characters that have been automatically grouped by the group module. The group invitations may be presented to the players via a user interface provided to the players through the client computing platforms. The group module may be configured to receive responses of the players to the group invitations. The responses may include acceptances, rejections, and/or proposed modifications to the character group (e.g., to include additional player-controlled characters, and/or other modifications).

The secondary instance module may be configured to generate secondary instances of player-controlled characters. A secondary instance of a player-controlled character may be an instance of a player-controlled character that will not be controlled by the player that typically controls the player-controlled character. The secondary instance of a player-controlled character may include and/or have access to some or all of the skills, attributes, visual characteristics, inventory, alliances, and/or other characteristics of the player-controlled character. The secondary instance of a player-controlled character may constitute a duplicate of the player-controlled character, or may be modified. The modification may be purposeful to designate that the secondary instance is indeed a secondary instance that is not controlled by the player corresponding to the player-controlled character. For example, the visual representation of the secondary instance may be visually marked as a secondary instance.

Responsive to a character group being formed by the group module at a synchronization point, the secondary instance module may be configured to generate secondary instances of the player-controlled characters in the character group such that a secondary character group may be formed for each of the player-controlled characters that includes a single player-controlled character and secondary instances of the other player-controlled characters in the character group.

By way of non-limiting example, responsive to a character group including a first player-controlled character, a second player-controlled character, and a third player-controlled character, a set of secondary character groups may be created. The set of secondary character groups may include secondary character groups that correspond to each of the first player-controlled character, the second player-controlled character, and the third player-controlled character, respectively.

The secondary character group corresponding to the first player-controlled character may include the first player-controlled character and secondary instances of the second player-controlled character and the third player-controlled character. The secondary character group corresponding to the second player-controlled character may include the second player-controlled character and secondary instances of the first player-controlled character and the third player-controlled character. The secondary character group corresponding to the third player-controlled character may include the third player-controlled character and secondary instances of the second player-controlled character and the third player-controlled character.

Responsive to the generation of secondary instances of the player-controlled characters in the character group, the game module may further be configured to generate separate instances of the set of asynchronous videogame content for the individual player-controlled characters in the character group and their corresponding secondary character groups. Each instance of the set of asynchronous videogame content may be provided to an individual player controlling one of the player-controlled characters in the character group. A given player may control his player-controlled character within his instance of the set of asynchronous videogame content while the player-controlled character is accompanied by a corresponding secondary character group made up of secondary instances of the other player-controlled characters in the character group. Since the set of asynchronous videogame content is asynchronous, the instance of the set of asynchronous videogame content provided to the given player will not reflect control of other players in their separate instances of the set of asynchronous videogame content.

The character control module may be configured to control secondary instances of player-controlled characters in asynchronous videogame content. This may include automatically controlling secondary instances of player-controlled characters accompanying a player-controlled character being controlled by a player through a set of asynchronous videogame content.

The status module may be configured to receive information related to the progress of player-controlled characters in character groups within sets of asynchronous videogame content. The status module may be configured to generate, based on the received information, status updates to group members of the player-controlled characters regarding the progress of the player-controlled characters within the asynchronous videogame content. The status updates may be presented to the players in a user interface provided through the client computing platforms. The user interface may include views of the videogame, with the status updates being presented in a real-time or near real-time manner.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
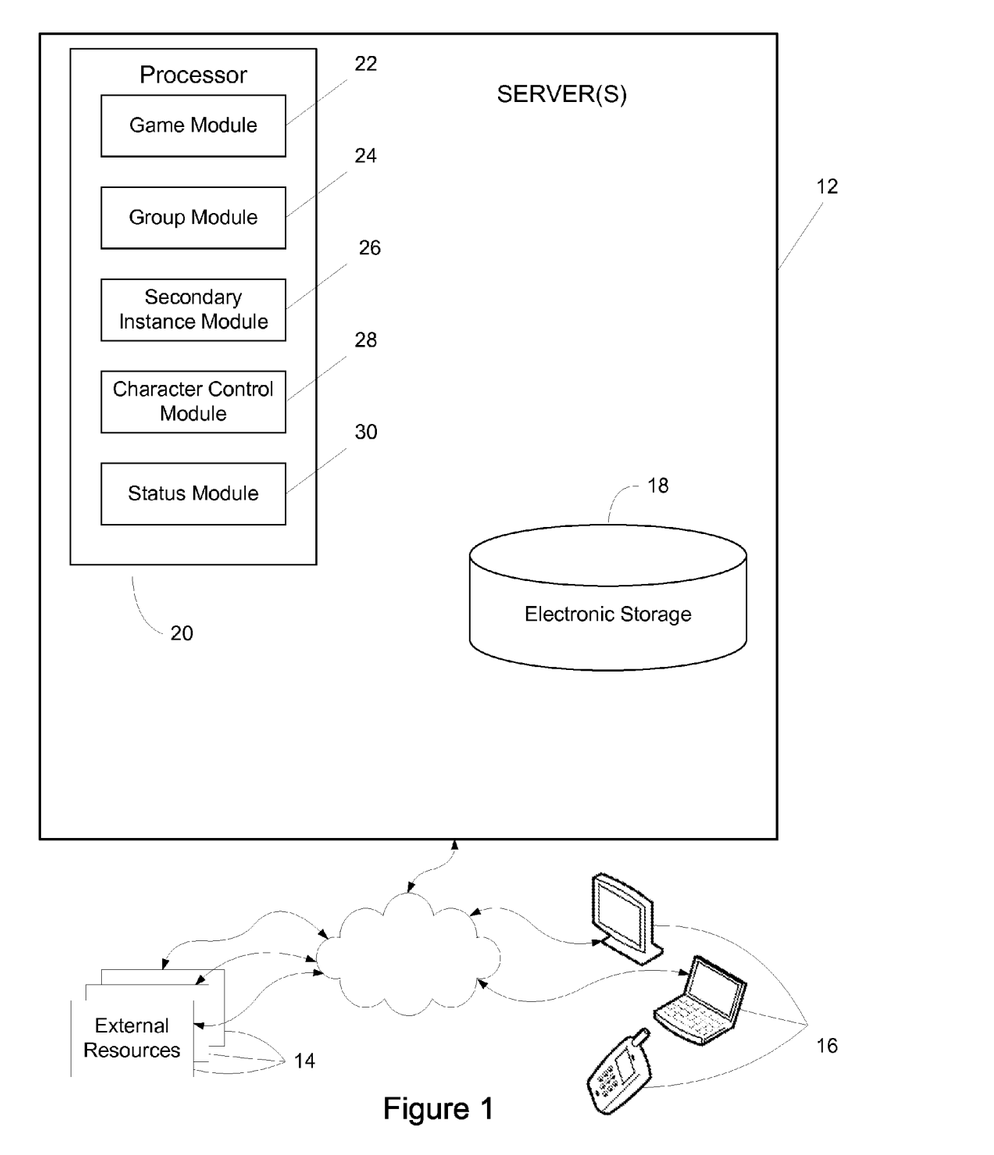
FIG. 1 illustrates a system configured to simulate group play within asynchronous videogame content, in accordance with one or more embodiments of the invention.

FIG. 1 illustrates a system 10 configured to simulate group play within asynchronous videogame content. Generally, asynchronous videogame content is less expensive to provide to players than synchronous videogame content with respect to network bandwidth, system storage, system processing, and/or other cost parameters. Simulating group play within asynchronous videogame content may provide savings with respect to these and/or other cost parameters while fostering sense of cooperation and/or community typically associated with synchronous videogame content. This may have an impact on gaining and/or retaining players of the videogame.

To simulate group play, system 10 may group player-controlled characters prior to entry into a set of asynchronous videogame content. Then separate instances of the set of asynchronous videogame content may be provided to players associated with the grouped player-controlled characters. In the separate instance provided to a given player, secondary instances of the player-controlled characters other than the player-controlled character being controlled by the given player are controlled automatically to accompany the player-controlled character being controlled by the given player. This gives the given player the sense of being accompanied by the other players, even though the player-controlled characters associated with the other players are not actually being controlled by the other players.

In some implementations, system 10 may include one or more servers 12, and/or other components. The system 10 may operate in communication and/or coordination with one or more external resources 14. Players may interface with system 10 and/or external resources 14 via client computing platforms 16. The components of system 10, servers 12, external resources 14, and/or client computing platforms 16 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12, external resources 14, and/or client computing platforms 16 may be operatively linked via some other communication media.

A given client computing platform 16 may include one or more processors configured to execute computer program modules. The computer program modules may be configured to enable one or more players associated with the given client computing platform 16 to interface with system 10 and/or external resources 14, and/or provide other functionality attributed herein to client computing platforms 16. By way of non-limiting example, the given client computing platform 16 may include one or more of a desktop computer, a laptop computer, a handheld computer, a NetBook, a Smartphone, a gaming console, and/or other computing platforms.

The external resources 14 may include sources of information, hosts and/or providers of virtual environments outside of system 10, external entities participating with system 10, and/or other resources. In some implementations, some or all of the functionality attributed herein to external resources 14 may be provided by resources included in system 10.

The server 12 may be configured to provide, or cooperate with client computing platforms 16, to provide a videogame to players. This may include hosting, serving, and/or otherwise providing a virtual space to the players within which the videogame is played the asynchronous environment to the players via client computing platforms 16. The server 12 may include electronic storage 18, one or more processors 20, and/or other components. The server 12 may include communication lines, or ports to enable the exchange of information with a network and/or other computing platforms.

Electronic storage 18 may comprise electronic storage media that electronically stores information. The electronic storage media of electronic storage 18 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 18 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 18 may store software algorithms, information determined by processor 20, information received from server 12, information received from client computing platforms 16, and/or other information that enables server 12 to function properly.

Processor(s) 20 is configured to provide information processing capabilities in server 12. As such, processor 20 may include one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some implementations, processor 20 may include a plurality of processing units. These processing units may be physically located within the same device, or processor 20 may represent processing functionality of a plurality of devices operating in coordination.

As is shown in FIG. 1, processor 20 may be configured to execute one or more computer program modules. The one or more computer program modules may include one or more of a game module 22, a group module 24, a secondary instance module 26, a character control module 28, a status module 30, and/or other modules. Processor 20 may be configured to execute modules 22, 24, 26, 28, and/or 30 by software; hardware; firmware; some combination of software, hardware, and/or firmware; and/or other mechanisms for configuring processing capabilities on processor 20.

It should be appreciated that although modules 22, 24, 26, 28, and 30 are illustrated in FIG. 1 as being co-located within a single processing unit, in implementations in which processor 20 includes multiple processing units, one or more of modules 22, 24, 26, 28, and/or 30 may be located remotely from the other modules. The description of the functionality provided by the different modules 22, 24, 26, 28, and/or 30 described below is for illustrative purposes, and is not intended to be limiting, as any of modules 22, 24, 26, 28, and/or 30 may provide more or less functionality than is described. For example, one or more of modules 22, 24, 26, 28, and/or 30 may be eliminated, and some or all of its functionality may be provided by other ones of modules 22, 24, 26, 28, and/or 30. As another example, processor 20 may be configured to execute one or more additional modules that may perform some or all of the functionality attributed below to one of modules 22, 24, 26, 28, and/or 30.

It will be appreciated that the illustration of modules 22, 24, 26, 28, and/or 30 being executed solely on processor 20 separate from client computing platforms 16 is not intended to be limiting. For example, in some implementations, the client computing platforms 16 may be configured to provide locally at least some of the functionality attributed above to one or more of modules 22, 24, 26, 28, and/or 30. Similarly, one or more of modules 22, 24, 26, 28, and/or 30 may be executed locally on individual client computing platforms 16 while others are executed on server 12.

The game module 22 may be configured to provide the videogame to players via client computing platforms 16. Providing the videogame to players may include providing videogame content to the players. The videogame content may define a virtual space. The virtual space may be hosted, served, and/or otherwise provided by game module 22. To provide the videogame to players via client computing platform 16, game module 22 and/or client computing platform 16 may generate views of the videogame (and/or the virtual space) that enable players to participate in the videogame.

A virtual space may comprise a simulated space (e.g., a physical space) that is accessible by a client (e.g., client computing platforms 16) that presents a view of the virtual space to a player. The simulated space may have a topography, express ongoing real-time interaction by the player, and/or include one or more objects positioned within the topography that are capable of locomotion within the topography. In some instances, the topography may be a 2-dimensional topography. In other instances, the topography may be a 3-dimensional topography. The topography may include dimensions of the virtual space, and/or surface features of a surface or objects that are "native" to the virtual space. In some instances, the topography may describe a surface (e.g., a ground surface) that runs through at least a substantial portion of the virtual space. In some instances, the topography may describe a volume with one or more bodies positioned therein (e.g., a simulation of gravity-deprived space with one or more celestial bodies positioned therein). A virtual space may include a virtual world, but this is not necessarily the case. For example, a virtual space may include a game space that does not include one or more of the aspects generally associated with a virtual world (e.g., gravity, a landscape, etc.).

Within a virtual space provided by virtual environment servers 12, player-controlled characters may be controlled by the players to interact with the virtual space. The player-controlled characters may include avatars. As used herein, the term "avatar" may refer to an object (or group of objects) present in the virtual space that represents an individual player. The avatar may be controlled by the player with which it is associated. The avatars may move through and interact with the virtual space (e.g., non-player characters in the virtual space, other objects in the virtual space). The avatar associated with a given player may be created and/or customized by the given player. The avatar may be associated with an "inventory" of virtual goods and/or currency that the player can use (e.g., by manipulation of the avatar and/or the items) within the virtual space.

The players may participate in the videogame by controlling player-controlled characters in the virtual space. Control may be exercised through control inputs and/or commands input by the players through client computing platforms 16.

The game module 22 may be configured such that the videogame and/or virtual space is at least partially text-based. In such implementations, the game module 22 may generate text and/or static graphics that convey activities, events, and/or circumstances currently present and/or transpiring in the videogame. This may include other player's activities currently transpiring within the videogame. The text and/or static graphics may be presented to players via client computing platforms 16.

The game module 22 may be configured such that the videogame content provided to the players includes separate sets of asynchronous videogame content. As used herein, the term "asynchronous videogame content" may refer to videogame content (e.g., a portion of the virtual space, an event in the virtual space, and/or other videogame content) that is provided to the players individually such that each player may be able to interact with a separate instance of the asynchronous videogame content (and/or view their own interactions) in real-time or near-real-time. However, interactions of other players with separate instances of the same asynchronous videogame content may not be reflected in views of the other instances of the asynchronous videogame content, at least not in real-time or near-real-time.

In some embodiments, results of interactions of a first player in a corresponding first instance of the videogame content may be conveyed to a second player, but the interactions themselves may not be perceptible within views of a second instance of the videogame content presented to the second player. For example, interactions of the first player in the first instance may have implications for the status, points, and/or inventory of the second player within the second instance. However, the interactions of the first player in the first instance, for example in the form of a character controlled by the first player to perform the interactions, may not be presented to the second player in the views of the second instance provided to the second player.

As such, each player may be somewhat isolated within a corresponding instance of the asynchronous videogame content from the other players. Although the instances of the asynchronous videogame content may be the same (or include similar features), real-time interaction between the players within the different instances of the asynchronous videogame content may be limited, if possible at all.

The separate sets of asynchronous videogame content may include separate events, activities, challenges, games, puzzles, training areas, building or crafting areas, gathering or mining areas, quests, spatial locations, temporal periods (in terms of "videogame time"), interactions with non-player characters, other discrete sets of videogame content, and/or combinations of the foregoing. Progression of a player-controlled character through the videogame may require a player to control the player-controlled character through these sets of asynchronous videogame content.

Successful completion of a set of asynchronous videogame content may provide the player-controlled character with a benefit in the game. The benefits may include bonuses in character metrics such as one or more of manna, gold (or other currency), skill or ability metrics, friendship or trustworthiness metrics, and/or other character metrics. The benefits may include virtual objects provided to the player within the virtual space. The virtual objects may be wearable, bearable, storable, tradable, sellable, transferrable, destroyable, usable, inhabitable, ridable, and/or disposable. The virtual objects may include one or more of a rare object, an object with abilities, a protective object, a tool, a weapon, a pet, a vehicle, a mount, and/or other objects.

The benefits may include alliances within the videogame. The alliances may provide the players with access to areas of the virtual space, aid during battle, connections for trade, and/or other benefits. The alliances may be with non-player characters and/or player-controlled characters. The benefits may include access to and/or control over places within the virtual space.

The benefits may include new skills and/or abilities such as climbing, swimming, flight, breathing underwater, passing through tangible obstructions (e.g., objects, walls, creatures, and/or other obstructions), partial to complete camouflage and/or invisibility, stealthy activities (e.g., hiding, moving silently, moving in shadow, and/or other activities), accelerated healing, rapid recovery of strength and/or any other recoverable attribute, resistance to damage from one or more sources (e.g., when struck by iron, acid, and/or other substances or weapons), absorption of energy from one or more sources (e.g., healing when struck by wooden weapons rather than being damaged, converting the damage of a fireball into increased magical energy, and/or other absorptions of energy), increased speed, generation of one or more player or system controlled copies of the original player-controlled character, the ability to know some to all of the history of an object in the character's possession or awareness (e.g., psychometry), the ability to control objects not in the character's possession (e.g., telekinesis or force field generation), animation and/or control of normally inanimate objects, the ability to transmute objects of one material into another (e.g., metal into wood, iron into water, and/or other transmutations), the ability to generate and/or control visual/auditory/olfactory/kinetic illusions, the ability to change the size and/or shape of the character or other characters or objects, the ability to manipulate temperature of one or more objects or within one or more areas, the ability to manipulate sound (e.g., suppressing or amplifying it), the ability to control or manipulate electric, gravitic and/or magnetic energies/fields, the ability to manipulate light and/or shadow, the ability to manipulate the skills and/or abilities and/or other attributes of one or more other characters (e.g., reducing strength to cause weakness or stealing health from another character to increase one's own).

The benefits may include new perceptions and/or perceptive abilities such as sound-based vision (e.g., echolocation or sonar) and/or vision using frequencies of light beyond those initially perceptible to all characters; ultra- and/or infrasonic hearing; a 'danger' sense notifying the player of potential enemies, traps and/or pitfalls within some specified range; a 'life' sense enabling the player to monitor all characters and/or creatures within a specified range; an ability to detect material of one or more types (e.g., metal, stone, water, or more specifically, gold, iron, granite, ivory and/or others) within a specified range; a mechanic sense providing the player awareness of machines within a specified range; senses able to perceive beyond and/or through what are obstacles to other characters, such as the ability to see objects enclosed within an opaque container, or beyond normal limitations such as size, enabling microscopic and/or telescopic vision; and/or other perceptive abilities.

Other benefits are contemplated.

Some sets of asynchronous videogame content may not be available to all of the player-controlled characters. For example, some sets of asynchronous videogame content may be "locked". To unlock previously locked sets of asynchronous videogame content, a player may be required to control a corresponding player-controlled character to perform some predetermined task or set of tasks. For example, one set of asynchronous videogame content may only be accessible, or unlocked, after successful participation in another set of asynchronous videogame content. Successful participation in another set of asynchronous videogame content may include completion of the set of asynchronous videogame content, performance in excess of some performance threshold in the set of asynchronous videogame content (e.g., winning, beating a score threshold, beating a timing threshold, and/or other performance thresholds), performance of some task or activity within the set of asynchronous videogame content, and/or other standards for success in participation in the set of asynchronous videogame content.

The game module 22 may be configured such that the sets of asynchronous videogame content may be accessible through synchronization points. One or more of the sets of asynchronous videogame content are only accessible through a corresponding synchronization point. Synchronization points may include locations within the virtual space corresponding to the videogame. The synchronization points may include synchronous locations in the virtual space in which player-controlled characters can interact with and/or observe each other in real-time or near real-time. The synchronization points may be asynchronous locations in the virtual space defined by asynchronous videogame content. The game module 22 may be configured to enable real-time and/or near real-time communication between players present at a synchronization point. Such communication may be accomplished via text chat, instant messaging, voice chat, and/or other communication mechanisms. To access a synchronization point, a player-controlled character may be required to interact with a non-player character, perform a challenge, win a challenge, find an item, enter a code, and/or perform other activities.

The group module 24 may be configured to form character groups of player-controlled characters. The character groups of player-controlled characters may be formed at the synchronization points in the videogame. In order to form the character groups, group module 24 may be configured to identify player-controlled characters present simultaneously at individual synchronization points. In identifying characters that are present simultaneously, group module 24 may consider time in the real world and/or time within the videogame. For example, the time in the videogame may be different for different player-controlled characters being controlled by players playing the videogame at the same time in the real world. Time may vary in the videogame based on time spent playing the videogame (e.g., for a single session or cumulatively), based on achievement in the videogame, and/or according to other parameters.

The group module 24 may be configured to form character groups automatically. The groups may be determined based on arrival time at the synchronization point (e.g., each set of four consecutive arrivals); based on races, classes, skills, abilities, and/or other features of the player-controlled characters at the synchronization point (e.g., some number of healers, some number of tanks, some number of casters, some number of damage inflicting characters, and/or other criteria); based on player-controlled character relationships (e.g., factions, guilds, friends, and/or other relationships); and/or based on other criteria. The character groups formed automatically by group module 24 may be imposed on the player-controlled characters at the synchronization point. The character groups formed automatically by group module 24 may be suggested to the players controlling the player-controlled characters.

The group module 24 may be configured to receive group requests from players controlling player-controlled characters at the synchronization point. The group requests may be requests to include two or more player-controlled characters in the same character group. The group module 24 may be configured to receive group requests from players via a user interface presented to players through client computing platforms 16.

Figure 2:
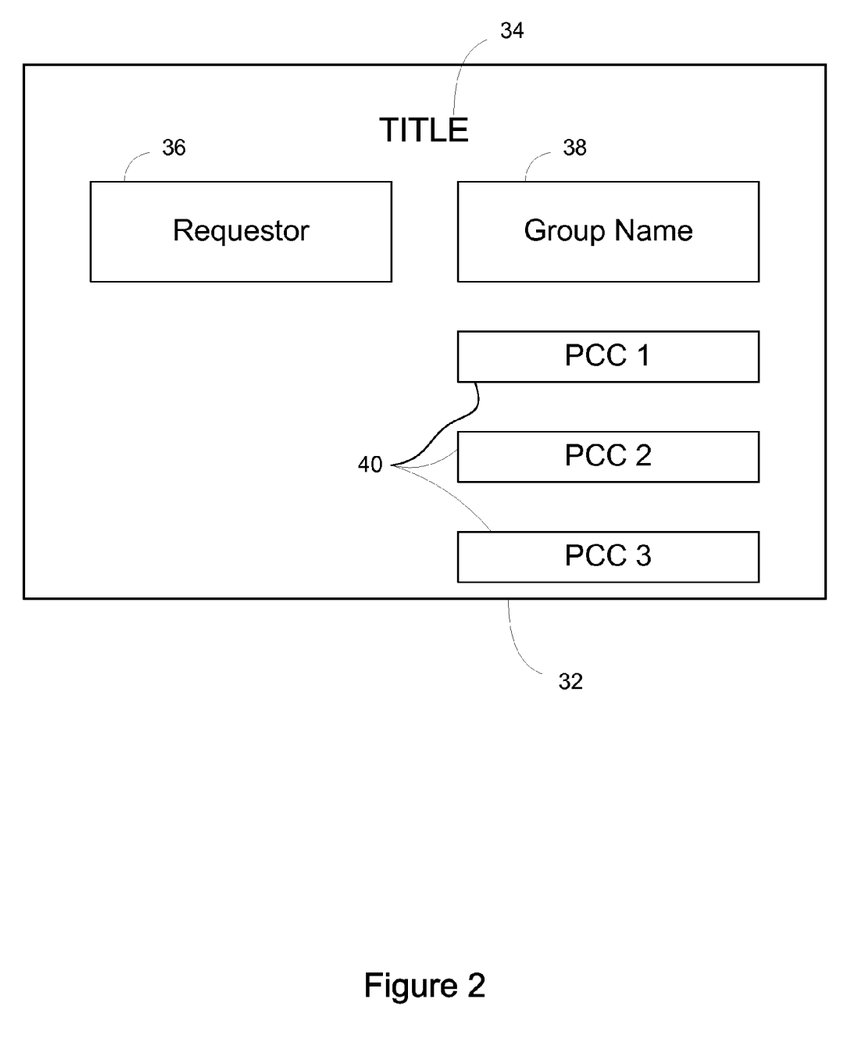
FIG. 2 illustrates a user interface, according to one or more embodiments of the invention.

By way of illustration, FIG. 2 shows a user interface 32 configured to receive group requests from players to group player-controlled characters at a synchronization point. The user interface 32 may include one or more of a title field 34, a requestor field 36, a group name field 38, one or more group participant fields 40, and/or other fields or information. The title field 34 may display the title of the synchronization point and/or a set of asynchronous videogame content accessed through the synchronization point. Providing the title of the set of asynchronous videogame content may be significant if the synchronization point provides access to more than one set of asynchronous videogame content. The requestor field 36 may be configured to display and/or receive player selection or entry of the name of the player-controlled character controlled by the player generating the group request. The group name field 38 may be configured to receive player selection or entry of a group name for the character group being requested by the group request. The group participant fields 40 may be configured to receive player selection or entry of individual player-controlled characters to be included in the character group.

Returning to FIG. 1, the group module 24 may be configured to present group invitations to players controlling player-controlled characters that have been invited to join a character group (e.g., by virtue of a group request), and/or players controlling player-controlled characters that have been automatically grouped by group module 24. The group invitations may be presented to the players via a user interface provided to the players through client computing platforms 16. The group module 24 may be configured to receive responses of the players to the group invitations. The responses may include acceptances, rejections, and/or proposed modifications to the character group (e.g., to include additional player-controlled characters, and/or other modifications).

Figure 3:
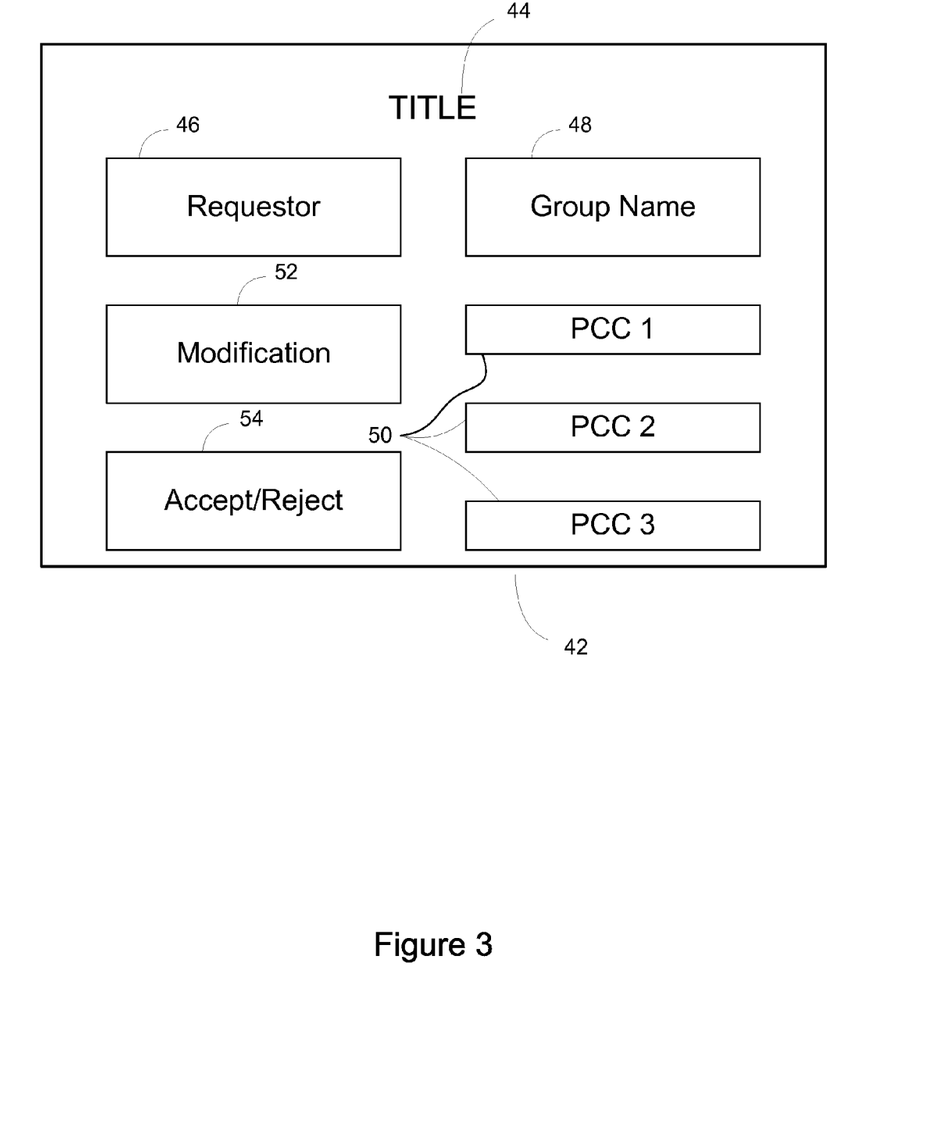
FIG. 3 illustrates a user interface, in accordance with one or more embodiments of the invention.

By way of illustration, FIG. 3 illustrates a user interface 42 configured to present a group invitation to a player controlling a player-controlled character at the checkpoint. The user interface 42 may include one or more of a title field 44, a requestor field 46, a group name field 48, one or more group participant fields 50, a modification field 52, an acceptance/rejection field 54, and/or other fields. The title field 44 may be configured to present the title of the synchronization point and/or a set of asynchronous videogame content that is accessed through the synchronization point. The requestor field 46 may be configured to present information identifying the player-controlled character controlled by the player that requested the character group associated with the group invitation to be generated. This may include the player-controlled character's name. The group name field 48 may be configured to present the name of the character group corresponding to the group invitation. The group participant fields 50 may be configured to present information identifying other player-controlled characters that have been or will be invited to join the character group, and/or information identifying other player-controlled characters already in the character group. The modification field 52 may be configured to receive player selection or entry of modifications to information presented in one or more of title field 44, requestor field 46, group name field 48, and/or group participant fields 50. In some implementations, modifications may be selected and/or entered by the player directly into the field to be modified, rather than through modification field 52. The acceptance/rejection field 54 may be configured to receive player selection or entry of an acceptance or a rejection to join the character group.

Returning to FIG. 1, secondary instance module 26 may be configured to generate secondary instances of player-controlled characters. A secondary instance of a player-controlled character may be an instance of a player-controlled character that will not be controlled by the player that typically controls the player-controlled character. The secondary instance of a player-controlled character may include and/or have access to some or all of the skills, attributes, visual characteristics, inventory, alliances, and/or other characteristics of the player-controlled character. The secondary instance of a player-controlled character may constitute a duplicate of the player-controlled character, or may be modified. The modification may be purposeful to designate that the secondary instance is indeed a secondary instance that is not controlled by the player corresponding to the player-controlled character. For example, the visual representation of the secondary instance may be visually marked as a secondary instance.

Figure 4:
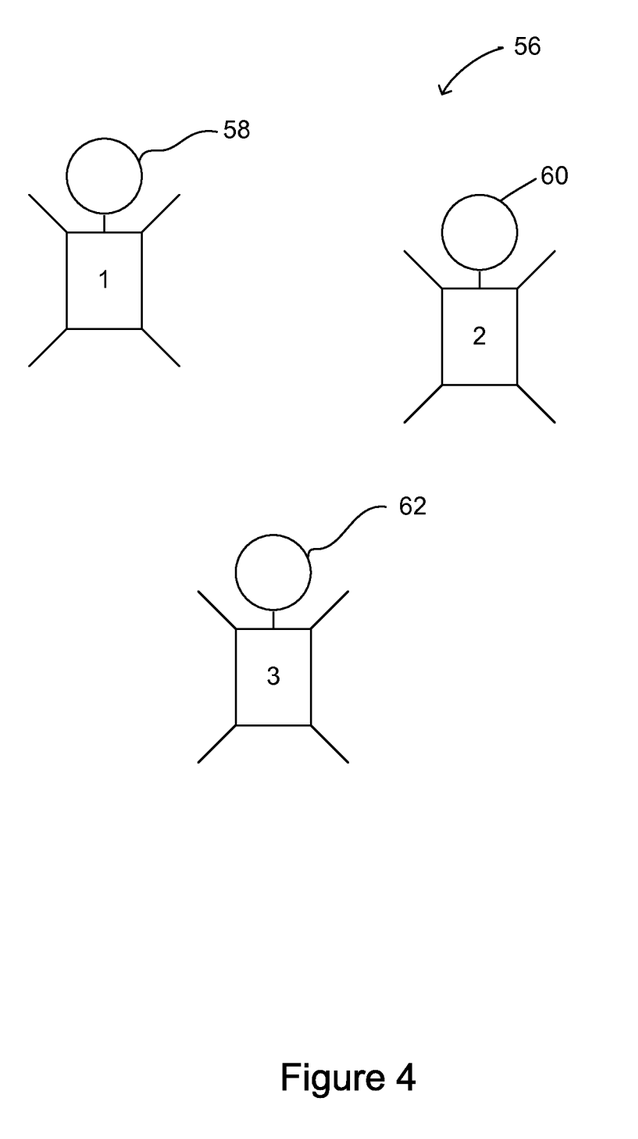
FIG. 4 illustrates a character group of player-controlled characters, according to one or more embodiments of the invention.

Responsive to a character group being formed by group module 24 at a synchronization point, secondary instance module 26 may be configured to generate secondary instances of the player-controlled characters in the character group such that a secondary character group is formed for each of the player-controlled characters that includes a single player-controlled character and secondary instances of the other player-controlled characters in the character group. By way of non-limiting illustration, FIG. 4 illustrates a character group 56 including a first player-controlled character 58, a second player-controlled character 60, and a third player-controlled character 62.

Figure 5:
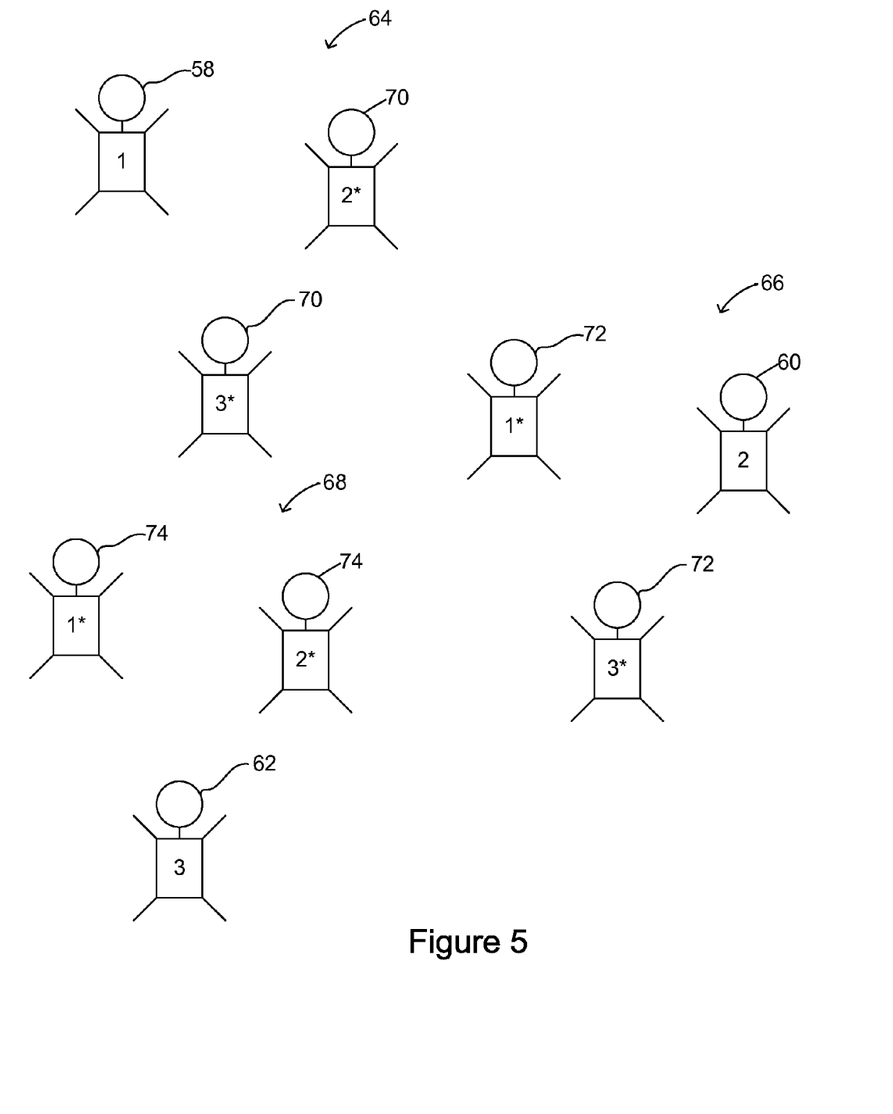
FIG. 5 illustrates a set of secondary character groups, in accordance with one or more embodiments of the invention.

FIG. 5 illustrates a set of secondary character groups 64, 66, and 68 that correspond to first player-controlled character 58, second player-controlled character 60, and third player-controlled character 62, respectively. As can be seen in FIG. 5, secondary character group 64 may include first player-controlled character 58 and secondary instances 70 of the second player-controlled character and the third player-controlled character. The secondary character group 66 may include second player-controlled character 60 and secondary instances 72 of the first player-controlled character and the third player-controlled character. The secondary character group 68 may include third player-controlled character 62 and secondary instances 74 of the second player-controlled character and the third player-controlled character. As is discussed herein, secondary character group 64 may accompany first player-controlled character 58 within a first instance of the set of asynchronous videogame content while secondary character group 66 may accompany second player-controlled character 60 within a second instance of the set of asynchronous videogame content and/or the secondary character group 68 may accompany third player-controlled character 62 within a third instance of the set of asynchronous videogame content.

Returning to FIG. 1, responsive to formation of a character group by group module 24 and the generation of secondary instances of the player-controlled characters in the character group, game module 22 may further be configured to generate separate instances of the set of asynchronous videogame content for the individual player-controlled characters in the character group and their corresponding secondary character groups. Each instance of the set of asynchronous videogame content may be provided to an individual player controlling one of the player-controlled characters in the character group. A given player may control his player-controlled character within his instance of the set of asynchronous videogame content while the player-controlled character is accompanied by a corresponding secondary character group made up of secondary instances of the other player-controlled characters in the character group. Since the set of asynchronous videogame content is asynchronous, the instance of the set of asynchronous videogame content provided to the given player will not reflect control of other players in their separate instances of the set of asynchronous videogame content.

The character control module 28 may be configured to control secondary instances of player-controlled characters in asynchronous videogame content. This may include automatically controlling secondary instances of player-controlled characters accompanying a player-controlled character being controlled by a player through a set of asynchronous videogame content. By way of example, referring back to FIG. 5, secondary instances 70 may be automatically controlled within a first instance of a set of asynchronous videogame content to accompany first player-controlled character 58. The secondary instances 72 may be automatically controlled within a second instance of the set of asynchronous videogame content to accompany second player-controlled character 60. The secondary instances 74 may be automatically controlled within a third instance of the set of asynchronous videogame content to accompany third player-controlled character 62.

It will be appreciated that the term "automatically controlled" may not refer to control over secondary instances of player-controlled characters that is fully automated, but instead to control over secondary instances of player-controlled characters that is separate from control inputs provided by the players that control the actual player-controlled characters corresponding to the secondary instances. For example, with respect to secondary character group 64, in the first instance of the set of asynchronous videogame content, the player controlling first player-controlled character 58 may partially control secondary instances 70. This may include setting objectives, selecting weapons, requesting assistance, selecting position (e.g., during a fight and/or at other times), and/or other direction and/or control. The term "automatically controlled" may refer to the fact that secondary instances 70 are not controlled by inputs received from the players controlling second player-controlled character 60 and/or third player-controlled character 62. Instead, inputs that control secondary instances 70 are generated automatically (outside of the direction and/or partial control received from the player controlling first player-controlled character 58).

The status module 30 may be configured to receive information related to the progress of player-controlled characters in character groups within sets of asynchronous videogame content. The status module 30 may be configured to generate, based on the received information, status updates to group members of the player-controlled characters regarding the progress of the player-controlled characters within the asynchronous videogame content. The status updates may be presented to the players in a user interface provided through client computing platforms 16. The user interface may include views of the videogame, with the status updates being presented in a real-time or near real-time manner.

For example, referring back to FIG. 5, progress information may be received for one or more of secondary character group 64, secondary character group 66, and/or secondary character group 68. Status updates may be generated to the player controlling first player-controlled character 58 as to the progress of secondary character group 66 and/or secondary character group 68 in the set of asynchronous videogame content. The status updates may include status information related to the secondary instances 72 and 74 of the first player-controlled character and/or group status information.

Figure 6:
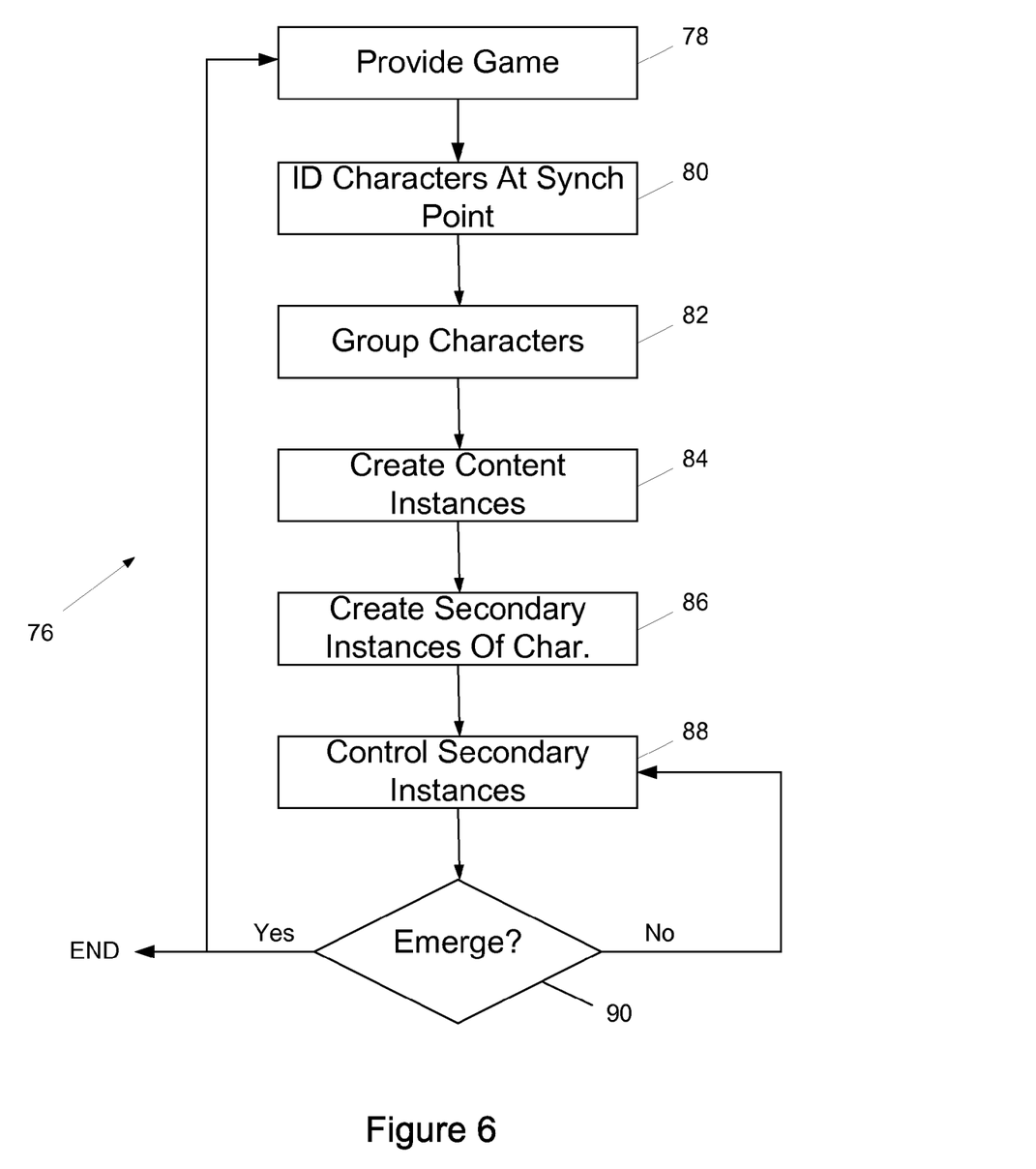
FIG. 6 illustrates a method of simulating group play within asynchronous videogame content, in accordance with one or more embodiments of the invention.

FIG. 6 illustrates a method 76 of simulating group play within asynchronous videogame content. The operations of method 76 presented below are intended to be illustrative. In some embodiments, method 76 may be accomplished with one or more additional operations not described, and/or without one or more of the operations discussed. Additionally, the order in which the operations of method 76 are illustrated in FIG. 6 and described below is not intended to be limiting.

In some embodiments, method 76 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 76 in response to instructions stored electronically on an electronic storage medium. The one or more processing devices may include one or more devices configured through hardware, firmware, and/or software to be specifically designed for execution of one or more of the operations of method 76.

At an operation 78, a videogame may be provided to players such that the player can participate in the videogame by controlling player-controlled characters. This may include generating views of the videogame that can be presented to the players. In some implementations, operation 78 may be performed by a game module similar to or the same as game module 22 (shown in FIG. 1 and described above).

At an operation 80, player-controlled characters present at a synchronization point may be identified. The player-controlled characters identified at operation 80 may include one or more of a first player-controlled character, a second player-controlled character, a third player-controlled character, and/or other player-controlled characters. The synchronization point may include a location within a virtual space associated with the videogame. The synchronization point may be an access point for one or more sets of asynchronous videogame content within the videogame. The one or more sets of asynchronous videogame content may include a first set of asynchronous videogame content. In some implementations, operation 80 may be performed by a group module similar to or the same as group module 24 (shown in FIG. 1 and described above).

At an operation 82, one or more character groups may be formed from the player-controlled characters identified at operation 80. The one or more character groups may be formed automatically and/or based on group requests received from players. Operation 80 may include generating group invitations to players controlling player-controlled characters and/or receiving responses to the group invitations indicating acceptance and/or rejection of the group invitations. The one or more character groups formed at operation 82 may include a first character group. The first character group may include the first player-controlled character, the second player-controlled character, the third player-controlled character, and/or other player-controlled characters. In some implementations, operation 82 may be performed by a group module similar to or the same as group module 24 (shown in FIG. 1 and described above).

At an operation 84, separate instances of the sets of asynchronous videogame content may be generated for individual players controlling player-controlled characters included in one of the character groups formed at operation 82. The separate instances of the sets of asynchronous videogame content may include a first instance, a second instance, a third instance, and/or other instances of the first set of asynchronous videogame content. The first instance of the first set of asynchronous videogame content may be generated for the player controlling the first player-controlled character. The second instance of the first set of asynchronous videogame content may be generated for the player controlling the second player-controlled character. The third instance of the first set of asynchronous videogame content may be generated for the player controlling the third player-controlled character. In some implementations, operation 84 may be performed by a game module similar to or the same as game module 22 (shown in FIG. 1 and described above).

At an operation 86, secondary instances of player-controlled characters included in the character groups may be generated. The secondary instances of player-controlled characters may be placed into secondary character groups with an individual player-controlled character with which they have been grouped at operation 82. Operation 86 may include generating secondary instances of the first player-controlled character, the secondary player-controlled character, the third player-controlled character, and/or other player-controlled characters for inclusion in a first secondary character group corresponding to the first player-controlled character, a second secondary character group corresponding to the second player-controlled character, a third secondary character group corresponding to the third player-controlled character, and/or other secondary character groups. The first secondary character group may include a secondary instance of the second player-controlled character, a secondary instance of the third player-controlled character, secondary instances of other player-controlled characters, and/or the first player-controlled character. The second secondary character group may include a secondary instance of the first player-controlled character, a secondary instance of the third player-controlled character, other secondary instances, and/or the second player-controlled character. The third secondary character group may include a secondary instance of the first player-controlled character, a secondary instance of the second player-controlled character, other secondary instances, and/or the third player-controlled character. Operation 86 may be performed by a secondary instance module similar to or the same as secondary instance module 26 (shown in FIG. 1 and described above).

At an operation 88, the secondary instances of the player-controlled characters may be controlled to accompany player-controlled characters within the separate instances of the sets of asynchronous videogame content. The secondary instances of player-controlled characters in the first secondary character group may be automatically controlled while accompanying the first player-controlled character in the first instance of the first set of asynchronous videogame content. The secondary instances of the player-controlled characters in the second secondary character group may be automatically controlled while accompanying the second player-controlled character in the second instance of the first set of asynchronous videogame content. The secondary instances of the player-controlled characters in the third secondary character group may be automatically controlled while accompanying the third player-controlled character in the third instance of the first set of asynchronous videogame content. In some implementations, operation 88 may be performed by a character control module similar to or the same as character control module 28 (shown in FIG. 1 and described above).

At an operation 90, a determination may be made as to whether individual secondary character groups have emerged from their corresponding instances of sets of asynchronous videogame content. Emerging from an instance of a set of asynchronous videogame content may include successfully completing the set of asynchronous videogame content, failing to complete the set of asynchronous videogame content, choosing an exit from the set of asynchronous videogame content, and/or other mechanisms for ceasing participation in the set of asynchronous videogame content. Successful completion of the set of asynchronous videogame content may require one or more of completion of a task, completion of a puzzle, defeating an opponent, perform a skill, win a game, create and/or use an item, exchange one or more messages with one or more other characters (player-controlled or system controlled), purchase and/or sell one or more items, be in a particular location at a particular date and/or time, possess a particular item and/or set of items at a particular date and/or time, any combination of any of the above, and/or other activities.

During participation in the set of asynchronous videogame content, one or more secondary instances of player-controlled characters in a secondary character group may leave the secondary character group. For example, a secondary instance may be killed, may be banished, may be sent to perform a side mission and/or tangential task, and/or may otherwise be separated from the secondary character group. This may have little to no impact on a player-controlled character corresponding to a secondary instance that has been separated from its secondary character group. This may be because the secondary instance is not controlled by the player that controls the corresponding player-controlled character (e.g., the player that controls the first player-controlled character does not control the secondary instance of the first player-controlled character).

If a given secondary character group (e.g., the player-controlled character of the given secondary character group and one or more secondary instances in the given secondary character group) are still in the corresponding instance of the set of asynchronous videogame content, operation 88 continues to control the secondary instances. If a given secondary character group emerges from the instance of the set of asynchronous videogame content, then method 76 may proceed accordingly. In some implementations, operation 90 may be performed by a game module similar to or the same as game module 22 (shown in FIG. 1 and described above).

In some implementations, a series of sets of asynchronous videogame content may be strung together, one after the next, such that as secondary character groups emerge from a set of asynchronous videogame content, the player-controlled characters in the secondary character groups become present at a next synchronization point. In such implementations, one or more sets of asynchronous videogame content may only be accessible through successful completion of a preceding set of asynchronous videogame content. For example, a second set of asynchronous videogame content may only be accessible after successful completion of the first set of asynchronous videogame content. At the next synchronization point, method 76 may begin again at operation 80, this time preparing and providing separate instances of a second set of asynchronous videogame content to the player-controlled characters in the manner described above. As such, at the next synchronization point, new character groups may be formed to proceed to the next set of asynchronous videogame content (e.g., the second set of asynchronous videogame content). It will be appreciated that the description of a "next" synchronization point may refer to a previously accessed synchronization point. In such implementations, the previously accessed synchronization point may provide access to a new set of asynchronous videogame content only to player-controlled characters that have successfully completed the previous set of asynchronous videogame content.

In some cases, some of the secondary character groups that started a set of asynchronous videogame content, such as the first asynchronous videogame content, may not make it to the next synchronization point. For example, the player-controlled character of a secondary character group may die, the player controlling the player-controlled character may choose to no longer participate in the set of asynchronous videogame content without reaching a successful conclusion, and/or the player-controlled character may leave the set of asynchronous videogame content through other mechanisms. As such, as player-controlled characters proceed through the chain of synchronization points, fewer and fewer of the player-controlled characters with which they were previously grouped may make it. A character group may proceed with the reduced number and/or the character group may be provided the opportunity to include player-controlled characters not previously included to round out their number.

The chaining of synchronization points and sets of asynchronous videogame content may enable players to proceed with automatically controlled companions (the secondary instances) through discrete sections of content, and then emerge and discuss how their experience compared to others in their character group. As player-controlled characters in the character group drop out, the attrition may replicate, to an extent, the attrition of a character group in synchronous videogame content as player-controlled characters drop out of a quest or activity due to lack of success and/or interest.

As was discussed above, completion of one or more sets of asynchronous videogame content may result in gaining a benefit within the videogame. In some implementations, if a secondary instance of a player-controlled character completes a set of asynchronous videogame content within a secondary character group, the player-controlled character corresponding to the secondary instance may receive a benefit along with the player-controlled character that was included in the secondary character group. The benefit provided to the player-controlled character corresponding to the secondary instance may be lesser than the benefit received by the player-controlled character included in the secondary character group.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to simulate group play within asynchronous videogame content such that the individual players control corresponding player-controlled characters within a videogame, wherein the players include a first player that controls a first player-controlled character and a second player that controls a second player-controlled character, the system comprising:
   one or more physical processors configured via computer-readable instructions to:
      effectuate presentation of views of a first instance of a first set of asynchronous videogame content to the first player;
      effectuate presentation of views of a second instance of the first set of asynchronous videogame content to the second player such that the first player and the second player participate in the first set of asynchronous videogame content separately from each other;
      receive a first set of information related to progress of the first player-controlled character in the first instance of the first set of asynchronous videogame content;
      receive a second set of information related to progress of the second player-controller character in the second instance of the first set of asynchronous videogame content;
      generate a first status update based on the first set of information;
      generate a second status update based on the second set of information;
      effectuate presentation of the first status update to the second player; and
      effectuate presentation of the second status update to the first player;
   wherein the first set of asynchronous videogame content is accessible to the first player-controlled character and the second player-controlled character through a synchronization point in the videogame; and
   wherein the computer-readable instructions to effectuate presentation of the first status update and the second status update are executed subsequent to the first player-controlled character and the second player-controlled character being present at the first synchronization point contemporaneously.

2. The system of claim 1, wherein the first synchronization point includes a virtual location in the video game.

3. The system of claim 1, wherein the computer-readable instructions are further configured to form a group of player-controlled characters including the first player-controlled character and the second player-controlled character, and wherein the computer-readable instructions to effectuate presentation of the first status update and the second status update are executed responsive to individual ones of the group of player-controlled characters reaching a particular virtual location in the videogame.

4. A system configured to simulate group play within asynchronous videogame content such that the individual players control corresponding player-controlled characters within a videogame, wherein the players include a first player that controls a first player-controlled character and a second player that controls a second player-controlled character, the system comprising:
   one or more physical processors configured via computer-readable instructions to:
      effectuate presentation of views of a first instance of a first set of asynchronous videogame content to the first player;
      effectuate presentation of views of a second instance of the first set of asynchronous videogame content to the second player such that the first player and the second player participate in the first set of asynchronous videogame content separately from each other;
      receive a first set of information related to progress of the first player-controlled character in the first instance of the first set of asynchronous videogame content;
      receive a second set of information related to progress of the second player-controller character in the second instance of the first set of asynchronous videogame content;
      generate a first status update based on the first set of information;
      generate a second status update based on the second set of information;
      effectuate presentation of the first status update to the second player; and
      effectuate presentation of the second status update to the first player;
   wherein the videogame further includes a second set of asynchronous videogame content that is accessible to the first and second player-controlled characters through a second synchronization point in the videogame.

5. The system of claim 4, wherein the second synchronization point in the videogame is only accessible to the first player subsequent to participation by the first player in the first set of asynchronous videogame content.

6. A system configured to simulate group play within asynchronous videogame content such that the individual players control corresponding player-controlled characters within a videogame, wherein the players include a first player that controls a first player-controlled character and a second player that controls a second player-controlled character, the system comprising:
   one or more physical processors configured via computer-readable instructions to:
      effectuate presentation of views of a first instance of a first set of asynchronous videogame content to the first player;
      effectuate presentation of views of a second instance of the first set of asynchronous videogame content to the second player such that the first player and the second player participate in the first set of asynchronous videogame content separately from each other;
      receive a first set of information related to progress of the first player-controlled character in the first instance of the first set of asynchronous videogame content;

receive a second set of information related to progress of the second player-controller character in the second instance of the first set of asynchronous videogame content;

generate a first status update based on the first set of information;

generate a second status update based on the second set of information;

effectuate presentation of the first status update to the second player; and effectuate presentation of the second status update to the first player;

wherein in the first instance of the first set of asynchronous videogame content at least partial control of the instance of the second player-controlled character is selectively ceded to the first player.

7. A computer-implemented method of simulating group play within asynchronous videogame content such that the individual players control corresponding player-controlled characters within a videogame, wherein the players include a first player that controls a first player-controlled character and a second player that controls a second player-controlled character, the method being implemented in a computer system comprising one or more processors configured to execute computer program modules, the method comprising:

effectuating presentation of views of a first instance of a first set of asynchronous videogame content to the first player that enable the first player to control the first player-controlled character within the first set of asynchronous videogame content, wherein the second player is without control within the first instance of the first set of asynchronous videogame content;

effectuating presentation of views of a second instance of the first set of asynchronous videogame content to the second player that enable the second player to control the second player-controlled character within the first set of asynchronous videogame content, wherein the first player is without control within the second instance of the first set of asynchronous videogame content;

receiving a first set of information related to progress of the first player-controlled character in the first instance of the first set of asynchronous videogame content;

receive a second set of information related to progress of the second player-controller character in the second instance of the first set of asynchronous videogame content;

generating a first status update based on the first set of information;

generating a second status update based on the second set of information;

effectuating presentation of the first status update to the second player; and effectuating presentation of the second status update to the first player;

wherein the first set of asynchronous videogame content is accessible to the first player-controller character and the second player-controlled character through a synchronization point in the videogame; and wherein effectuating presentation of the first update and the second update is performed subsequent to the first player-controlled character and the second player-controlled character being present at the first synchronization point contemporaneously.

8. The method of claim 7, wherein the first synchronization point includes a virtual location in the video game.

9. The method of claim 7, further comprising:

forming a group of player-controlled characters including the first player-controlled character and the second player-controlled character, wherein effectuating presentation of the first status update and the second status update is performed responsive to individual ones of the group of player-controlled characters reaching a particular virtual location in the videogame.

10. A computer-implemented method of simulating group play within asynchronous videogame content such that the individual players control corresponding player-controlled characters within a videogame, wherein the players include a first player that controls a first player-controlled character and a second player that controls a second player-controlled character, the method being implemented in a computer system comprising one or more processors configured to execute computer program modules, the method comprising:

effectuating presentation of views of a first instance of a first set of asynchronous videogame content to the first player that enable the first player to control the first player-controlled character within the first set of asynchronous videogame content, wherein the second player is without control within the first instance of the first set of asynchronous videogame content;

effectuating presentation of views of a second instance of the first set of asynchronous videogame content to the second player that enable the second player to control the second player-controlled character within the first set of asynchronous videogame content, wherein the first player is without control within the second instance of the first set of asynchronous videogame content;

receiving a first set of information related to progress of the first player-controlled character in the first instance of the first set of asynchronous videogame content;

receive a second set of information related to progress of the second player-controller character in the second instance of the first set of asynchronous videogame content;

generating a first status update based on the first set of information;

generating a second status update based on the second set of information;

effectuating presentation of the first status update to the second player; and effectuating presentation of the second status update to the first player;

wherein the videogame includes a second set of asynchronous videogame content that is accessible to the first and second player-controlled characters through a second synchronization point in the videogame.

11. The method of claim 10, wherein the second synchronization point in the videogame is only accessible to the first player subsequent to participation by the first player in the first set of asynchronous videogame content.

12. A computer-implemented method of simulating group play within asynchronous videogame content such that the individual players control corresponding player-controlled characters within a videogame, wherein the players include a first player that controls a first player-controlled character and a second player that controls a second player-controlled character, the method being implemented in a computer system comprising one or more processors configured to execute computer program modules, the method comprising:

effectuating presentation of views of a first instance of a first set of asynchronous videogame content to the first player that enable the first player to control the first player-controlled character within the first set of asynchronous videogame content, wherein the second player is without control within the first instance of the first set of asynchronous videogame content;

effectuating presentation of views of a second instance of the first set of asynchronous videogame content to the second player that enable the second player to control the second player-controlled character within the first set of asynchronous videogame content, wherein the first player is without control within the second instance of the first set of asynchronous videogame content;

receiving a first set of information related to progress of the first player-controlled character in the first instance of the first set of asynchronous videogame content;

receive a second set of information related to progress of the second player-controller character in the second instance of the first set of asynchronous videogame content;

generating a first status update based on the first set of information;

generating a second status update based on the second set of information;

effectuating presentation of the first status update to the second player; and effectuating presentation of the second status update to the first player;

wherein automatically controlling the instance of the second player-controlled character includes selectively ceding, to the first player in the first instance of the first set of asynchronous videogame content, at least partial control of the instance of the second player-controlled character.

* * * * *